United States Patent
Mazumder et al.

(10) Patent No.: US 9,238,594 B2
(45) Date of Patent: Jan. 19, 2016

(54) TEMPLATED GROWTH OF POROUS OR NON-POROUS CASTINGS

(75) Inventors: Prantik Mazumder, Ithaca, NY (US); Frederick Ernest Noll, Lewes, DE (US); John Forrest Wright, Jr., Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 680 days.

(21) Appl. No.: 13/617,429

(22) Filed: Sep. 14, 2012

(65) Prior Publication Data

US 2013/0011604 A1 Jan. 10, 2013

Related U.S. Application Data (62) Division of application No. 12/393,804, filed on Feb. 26, 2009, now Pat. No. 8,293,010.

(51) Int. Cl.
*C30B 11/04* (2006.01)
*C04B 38/00* (2006.01)
*B28B 11/04* (2006.01)

(52) U.S. Cl.
CPC ............. *C04B 38/0006* (2013.01); *B28B 11/04* (2013.01); *Y10T 117/1028* (2015.01); *Y10T 428/24149* (2015.01); *Y10T 428/24157* (2015.01)

(58) Field of Classification Search
CPC .................................. C30B 11/04; C30B 11/14
See application file for complete search history.

(56) References Cited

U.S. PATENT DOCUMENTS

| | | | |
|---|---|---|---|
| 4,417,908 A | 11/1983 | Pitcher, Jr. ...................... 55/523 |
| 4,590,043 A | 5/1986 | Sanjurjo ........................ 422/189 |
| 4,753,783 A | 6/1988 | Sanjurjo ........................ 423/350 |
| 5,628,938 A | 5/1997 | Sangeeta et al. ................. 264/28 |
| 6,399,176 B1 | 6/2002 | Francois ......................... 428/67 |
| 6,520,241 B2 | 2/2003 | Francois .......................... 164/97 |
| RE39,998 E | 1/2008 | Francois ......................... 428/67 |
| 2002/0125240 A1 | 9/2002 | Ogura et al. ............... 219/444.1 |

FOREIGN PATENT DOCUMENTS

| | | |
|---|---|---|
| EP | 0424981 A1 | 7/1983 |
| JP | 09-124390 | 5/1997 |
| JP | 2001-192280 | 7/2001 |
| WO | 91/17280 A1 | 11/1991 |
| WO | 2010/036801 A2 | 4/2010 |

OTHER PUBLICATIONS

Russell, et al, "Tabletop thermoacoustic refrigerator for demonstrations," Am. J. Phys. 70 (12) Dec. 2002.
Arndt, et al, "Elastic, low density epoxy/clay acrogel composites," J. Mater Chem., 2007, 15, 3525-3529.
Bandi, et al, "Temperature-Responsive Clay Aerogel—Polymer Composites," Macromolecules 2005, 28, 9216-9220.

(Continued)

*Primary Examiner* — Robert M Kunemund
(74) *Attorney, Agent, or Firm* — Russell S. Magaziner (57) ABSTRACT

A method of forming a templated casting involves incorporating a liquid feedstock into the channels of a honeycomb substrate to form a feedstock-laden substrate, and directionally solidifying the liquid feedstock within the channels.

3 Claims, 4 Drawing Sheets

(56) References Cited

OTHER PUBLICATIONS

Devílle, "Freeze-Casting of Porous Ceramics: A review of Current Achievements and Issues," Advanced Engineering Materials 2008, 10, No. 3.

Deville, et al, "Freeze casting of hydroxyapatite scaffolds for bone tissue engineering," J. Bio Materials, Jun. 28, 2006.

A TMS Publication, "Fluid Flow Phenomena in Metals Processing," Proceedings of a symposium sponsored by EPD, LMD, and MPMD divisions of The Minerals, Metals & Materials Society) Feb. 28-Mar. 4, 1999.

Deville, et al, "Freezing as a Path to Build Complex Composites," Science 311,515 (2006).

Hostler, et al, "Thermal conductivity of a clay-based aerogel," Heat and Mass Transfer (2008), doi:10.1016/J.ijheatmasstransfer.2008.07.002.

Knauer, et al, "Phase Measuring Deflectometry: a new approach to measure specular free-form surfaces," Instute of Optics, 2004.

Liu, et al, "A new thermal assembly design for the directional solidification of transparent alloys," J. of Crystal Growth 240 (2002) 560-568.

Mazumder, et al, "A Model of Convection-Induced Oscillatory Structure Formation in Peritectic Alloys," Metallurgical and Materials Transactions A, vol. 31A, Apr. 2000—1233.

Mazumder, et al, "Convection Induced Pattern Formation In Directional Solidification," Fluid Flow Phenomena in Metal Processing, The Minerals, Metals & Materials Society, 1999.

Mazumder, et al, "Integrated simulation of thermo-solutal convection and pattern formation in directional solidification," Applied mathematical Modelling 28 (2004) 109-125.

Rusher, "Strength Factors of Ceramic Shell Molds," Cast Research Journal Dec. 1974 vol. 10, No. 4, Mar. 1975, vol. 11, No. 1.

Somlai, et al, "Facile Processing of Clays into Organically-Modified Aerogels," AIChE Journal Mar. 2006, vol. 52, No. 3.

Trivedi, et al, "Directional solidification microstructures in diffusive and convective regimes," J. of Crystal Growth 222, (2001), 365-379.

Trivedi, et al, "Dynamic Pattern Formulation in the Two Phase Region of Peritectic Systems," Ames Laboratory US-DOE, Iowa State University, Ames, IA 50011, $2^{nd}$ workshop on Solidificaiton Microstructures, Zermatt, Jul. 5-10, 1998.

Trevedi, et al., "Microstructrue development in the directionally solidified A1-4.0 wt% Cu alloy system," Science and Technology of Advanced Materials 2 (2001) 309-320.

Trevedi, et al, "The Effect of Convection on Disorder in Primary Cellular and Dendritic Arrays," Mettallugical and Materials Transactions A, vol. 33A, Dec. 2002—3763.

Wollan, et al., "Development of a Thermoacoustic Natural Gas Liquefier," Presentation at 2002 AIChE New Orleans Meeting, New Orleans, LA Mar. 11-14.

Zhang, et al., "Aligned two- and three-dimensional structures by directional freezing of polymers and nanoparticles," Nature Materials, vol. 4, Oct. 2005 p. 787.

CN Application No. 201080015843.9, filed Sep. 26, 2011, Office Action.

JP Application No. 2011-552142, filed Aug. 26, 2011, Office Action.

TEMPLATED GROWTH OF POROUS OR NON-POROUS CASTINGS

CROSS-REFERENCE TO RELATED APPLICATIONS

This is a divisional of U.S. patent application Ser. No. 12/393,804 filed on Feb. 26, 2009 now U.S. Pat. No. 8,293,010, the content of which is relied upon and incorporated herein by reference in its entirety, and the benefit of priority under 35 U.S.C. §120 is hereby claimed.

BACKGROUND AND SUMMARY

The present invention relates generally to the templated growth of porous or non-porous castings, and more specifically to the formation of porous or non-porous castings via directional solidification within a honeycomb substrate.

Porous substrates can be used in a wide variety of applications including catalysis, filtration, membranes, etc. And while numerous processing techniques such as extrusion and foaming have been developed to produce porous and other cellular materials, it remains difficult during processing to precisely control the size, shape, directionality, isotropy (or anisotropy), connectivity and tortuosity of the porosity and/or the cellular structure. An additional challenge in forming cellular materials relates to the ubiquitous use of pore forming agents and the difficulties associated with removing them from the final product.

Non-porous substrates comprising crystalline metals (e.g., Cu) and semiconductors (e.g., Si, GaAs, etc.) can be used in both semiconductor and non-semiconductor applications. For example, ingots of polycrystalline silicon can be prepared for photovoltaic applications via directional solidification in quartz crucibles as an alternative to Czochralski (CZ) growth. In addition to semiconductor materials, directional solidification can also be used to form metallic and ceramic substrates. As used herein, a substrate is a material upon which a process is conducted, or upon which a device or structure is constructed.

Directional solidification relates generally to a series of measures applied to control a liquid-to-solid phase transformation and the attendant formation of a solidified or cast body. Thus, the cast body or cast structure described herein is a solid shape. Directional solidification involves passing a liquid or molten feedstock through a temperature gradient in order to cause freezing (solidification) of the feedstock.

The liquid feedstock can comprise a single-component liquid such as molten silicon or a multi-component liquid such as molten alloys (e.g., silicon-germanium alloys). In turn, multi-component liquid feedstocks can comprise either a single phase (e.g., molten Si—Ge alloys or water-PVA solutions) or multiple phases. An example of a multi-phase liquid feedstock is a dispersion of gas bubbles, immiscible liquid and/or solid particles in one or more liquids. A dispersion can be an emulsion or a colloid.

Directional solidification can be used to form porous or non-porous materials, including metals, semiconductors, ceramics, polymers or composites thereof. Microstructured, cellular materials, for example, can be cast from a multi-component feedstock that comprises a dispersion (i.e., slurry) of particles in a liquid. The process involves solidifying the liquid feedstock, removing the solidified (previously liquid) phase, and optionally densifying the resulting structure. In the case of unidirectional freezing, a porous body can be formed having unidirectional channels (i.e., linear porosity) where the channels are formed from the volume previously occupied by the solidified phase. In turn, non-porous castings can be made from single component or multi-component liquid feedstocks such as, for example, molten silicon or molten metal alloys. Directional solidification can be used as a near net shape forming route.

In both single- and multi-component liquid feedstock systems, in order to control the microstructure and hence the resulting properties of the solidified material, it is important during solidification to maintain a spatially-uniform solidification front (solid-liquid interface). In addition, in multi-component systems it is important to maintain a laterally uniform distribution of particles and/or solute along the solid-liquid interface. These conditions are difficult to achieve in practice due to the presence of density gradient-driven convection in the liquid phase.

Convection in directional solidification results from inevitable thermal gradients within the system. Even in the example of vertically stable density stratification, the radial temperature gradients that are present in the liquid can produce convention currents. The convection currents can generate severe solute segregation as well as non-uniform (i.e., macroscopically-curved) solidification fronts. The solute segregation, in turn, can lead to concentration gradient-driven convection that may assist or oppose thermally driven convection. In the example of particulate-laden feedstocks, the convection currents can sweep the particles along the solid-liquid interface, which can lead to a highly non-uniform particle distribution. This problem will generally become more pronounced as the effective dimension of the liquid increases.

When producing porous castings via directional solidification, other issues that can be encountered, particularly with larger volume castings, are the loss of pore continuity or connectivity during freezing due to nucleation and growth of non-parallel grains and the inadequacy of green body strength in pre-densified samples.

In view of the foregoing, it would be advantageous to develop a method for preparing porous or non-porous castings via directional solidification that reduces thermal and/or solutal convection induced non-homogeneity along the solid-liquid interface, reduces the lack of green body strength in scaled-up samples, and reduces the loss of axial connectivity and the increase in tortuosity in porous castings due to the nucleation, growth and impingement of non-parallel grains.

According to one embodiment, a method of forming a templated casting comprises incorporating a liquid feedstock into the channels of a honeycomb substrate to form a feedstock-laden substrate, and directionally solidifying the liquid feedstock within the channels. The casting can comprise a porous or a non-porous structure.

A porous casting can be formed by solidifying a multi-component feedstock. According to one non-limiting example, the formation of a porous casting comprises incorporating a liquid dispersion into channels of a honeycomb substrate to form a dispersion-laden substrate, the dispersion comprising particles dispersed in a liquid, moving the dispersion-laden substrate into a cooled zone of a solidification apparatus in order to directionally solidify the liquid within the channels, and removing the solidified liquid from within the channels to form a structure that comprises a porous body of the particles within the channels. Optionally, the particles, which can comprise one or more of metallic, semiconducting, ceramic and polymeric particles, can be sintered or impregnated to densify the cast structure. A non-porous casting can be formed by solidifying a single-component or a multi-component feedstock by omitting the act of removing the solidified phase.

In a further embodiment, a templated casting includes a honeycomb substrate having a plurality of channels, and a directionally-ordered cast structure incorporated within the channels. The honeycomb substrate itself can comprise a metallic, semiconducting, ceramic or polymeric material, or mixtures or composites thereof. By way of example, a honeycomb substrate can be formed from compounds such as plaster of Paris (e.g., $CaSO_4.0.5H_2O$) or elements such as sulfur. Optionally, the honeycomb substrate can be removed to yield a plurality of directionally-ordered castings of metallic, semiconducting, ceramic or polymeric material, or mixtures or composites thereof.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

A method of forming a templated casting comprises incorporating a liquid feedstock into the channels of a honeycomb substrate to form a feedstock-laden substrate, and directionally solidify the liquid feedstock within the channels.

Prior to solidifying the liquid feedstock, the liquid feedstock can comprise a single-component liquid (e.g., single phase) or a multi-component liquid (e.g., single phase or multi-phase). Table 1 sets forth example liquid feedstocks suitable for forming a templated casting.

TABLE 1

Example Single- and Multi-Component Liquid Feedstocks

| | Single Component | Multi-Component |
|---|---|---|
| Single Phase | Si, Cu, Ge, water | Si + Ge, Ga + As, silicic acid + water, PVA + water |
| Multi-Phase | slush | alumina + PVA + water |

The liquid feedstock can include any material capable of undergoing a temperature-driven liquid-to-solid phase transformation. In addition to metallic and semiconducting materials, which can be made molten, the liquid feedstock can include water, alcohols, naphthalene, etc.

The liquid feedstock is incorporated into the channels of a honeycomb substrate. As used herein, a honeycomb substrate refers to a solid structure comprising a plurality of substantially parallel or radially-extending channels that are defined by interconnected and interrelated partitions. The body of channels is defined by a peripheral wall or skin and each of the channels, except possibly those adjacent to the peripheral wall, have essentially the same geometry (shape and dimensions). The cross-sectional shape of the channels can be circular, triangular, square, rhombohedral, hexagonal, etc. as well as combinations thereof. Exemplary cross-sectional channel dimensions (e.g., height and width or diameter) can range from about 500 μm to 1 cm. Channel lengths, which can correspond to the overall length of the honeycomb substrate, can vary from 1 cm to 1 m. The interconnected and interrelated partitions, which define the channel walls, can have a web thickness ranging from about 0.05 mm to 2.5 mm. The partitions may be porous or non-porous.

The honeycomb substrate can be formed from a variety of different materials, including metals, semiconductors, ceramics and/or polymers. For example, the honeycomb substrate can comprise Teflon® or a Pyrex® glass. According to one embodiment, the honeycomb substrate comprises a Celcor® cordierite honeycomb monolith, which is marketed by Corning, Inc. Celcor® honeycomb substrates can have a channel density ranging from about 200 to 900 channels/in$^2$ with a corresponding wall thickness ranging from about 2 to 6 mils. The open frontal area of a Celcor® honeycomb substrate is about 50 to 95%. Individual channels within the Celcor® honeycomb can comprise hydrophobic porous surfaces that facilitate deep-bed freeze drying of the liquid feedstock. Additional aspects of suitable honeycomb substrates are disclosed in commonly-owned U.S. Pat. Nos. 5,114,643, 4,417,908 and 4,323,614, the contents of which are hereby incorporated by reference in their entirety.

The liquid feedstock can be incorporated into the channels via capillary forces, gravity or by utilization of a pressure gradient. The liquid feedstock can be backfilled into the channels by wetting, vacuum draw and/or intrusion.

During directional solidification, the liquid feedstock is advantageously maintained homogeneously incorporated throughout the channels of the honeycomb substrate. Various approaches can be used to contain the liquid feedstock within the channels. In one approach, the liquid feedstock is loaded into a suitable crucible, the honeycomb substrate is submerged into the liquid feedstock in order to incorporate the liquid feedstock into the channels, and the crucible, which contains the liquid feedstock having the honeycomb substrate submerged therein, is moved through the furnace. In an alternate approach, after incorporating liquid feedstock into the channels, one axial end face of the honeycomb can be capped to retain the liquid feedstock therein.

Care should be taken to prevent leaks and to minimize settling of multi-component liquid feedstocks. In order to avoid air bubble dissolution, the liquid feedstock can be de-aired before or after incorporating the feedstock into the honeycomb substrate.

Directional solidification can be carried out using a variety of solidification apparatus designs. According to embodiments, directional solidification is carried using the vertical Bridgman method or variations thereof. With the vertical Bridgman method, a tube type furnace is provided with a heating unit that produces a heated zone and a cooling unit that produces a cooled zone that together define a temperature gradient therebetween and within the furnace.

The temperature of the heated zone is greater than the melting point of a liquid phase that constitutes the liquid feedstock, while the temperature of the cooled zone is less than the freezing point of the liquid phase. For example, the temperature of the heated zone can range from about −20° C. to 100° C., and the temperature of the cooled zone can range from about −200° C. to 0° C. Crystal growth (solidification) can thus be achieved by moving the liquid feedstock-containing honeycomb substrate from the heated zone through the temperature gradient into the cooled zone. It is to be understood that moving the honeycomb substrate through the furnace merely involves changing the relative positions of the honeycomb substrate with respect to the heated and cooled zones. Thus, "moving" as used herein can include moving the honeycomb substrate, moving the heating and/or cooling units, or both.

In the foregoing solidification apparatus design, because temperature gradients can result in natural convection in the liquid phase that can induce a macroscopically-curved solid-liquid interface and a laterally non-uniform distribution of particles and/or solute, an insulated (adiabatic) zone between the heated zone and the cooled zone can be used to maintain a well-defined axial gradient and minimize radial temperature gradients, which in turn minimizes natural convection, concentration gradients within the liquid feedstock, and curvature of the solid-liquid interface. A length of the adiabatic zone can range from about 1 mm to 10 meters (e.g., about 1, 5, 10 or 20 cm).

In a variation of the Bridgman method, which is referred to as the vertical gradient freeze method, both the liquid feedstock-containing honeycomb substrate and the heating/cooling units are held stationary while the heat input (e.g., the heat input at one end of the furnace) is temporally adjusted so as to effectively move the location of the temperature gradient with respect to the honeycomb substrate. Because the vertical gradient freeze method does not involve the translation of any moving parts, it may result in less agitation of the liquid feedstock during solidification.

The morphology of the solid-liquid interface can be controlled by the choice of feedstock composition, as well as by the temperature gradient and the crystal growth rate. The temperature gradient is controlled by the heated zone and cooled zone temperatures, while the velocity of the solid-liquid interface and hence the growth rate is controlled by the relative translation rates. For instance, at a constant temperature gradient, the spacing between cells or dendrites typically decreases with increasing growth rate. Advantageously, use of a Bridgman directional solidification system affords independent control of both the thermal gradient and the resulting crystal growth rate.

In both the vertical Bridgman method and the vertical gradient freeze method, the honeycomb substrate is advantageously oriented such that its axial channel dimension is aligned substantially parallel to the direction of crystal growth. As the honeycomb substrate is moved through the temperature gradient (or vice versa), the relative rate of translation can be constant or variable. The motion can optionally accompany agitation (e.g., dither).

As the liquid feedstock passes into the adiabatic zone where the local temperature is less than the freezing point of the liquid phase, the liquid feedstock is solidified, which can result in the formation of continuous crystals. In an embodiment, the process is controlled so that the solidification front (solid-liquid interface) is maintained at a constant position within the adiabatic zone, i.e., by configuring the system so that the crystal growth rate and the net rate of translation are equal.

The liquid-to-solid phase transformation can be accomplished in a single pass through the apparatus, or via multiple passes, which can each involve full or partial re-melting and/or re-freezing. A multi-pass process can be used to refine the microstructure of the casting.

The morphology of the directionally solidified crystals is a strong function of the local thermal conditions. For instance, if the liquid feedstock ahead of the solid-liquid interface is sufficiently undercooled, the solidification interface can acquire a complex, non-planar morphology comprising cells or dendrites. The greater the undercooling, the more complex can be the morphology. For large undercooling and high solidification rates, for example, the crystalline morphology usually comprises long dendrites having side branches. Columnar growth, which is advantageous for forming anisotropic, linear porosity, can be achieved at relatively low growth rates.

It is to be appreciated that a plurality of grains can nucleate and grow within each channel of the honeycomb substrate. According to an embodiment, one or more seed crystals can be incorporated into each channel prior to solidifying the liquid feedstock. The seed crystals can be used to promote a desired crystal orientation, which can promote oriented, single crystal growth and enhance the directionality of the resulting cast structure.

A method of forming a porous casting comprises incorporating a multi-component liquid feedstock into the channels of a honeycomb substrate. A multi-component feedstock can be a multi-phase mixture such as a slurry that comprises particles dispersed in a suitable single- or multi-component liquid or a single-phase solution. Slurries can consist essentially of a solid particle-liquid mixture such as alumina particles dispersed in water, or can further include additional solvents or solutes, such as alumina particles dispersed in a water-PVA solution.

An exemplary method includes incorporating a multi-component liquid feedstock into the channels of a honeycomb substrate to form a feedstock-laden substrate, the multi-component liquid feedstock including a liquid (e.g., solvent) and at least one solute or dispersion of solid particles, moving the feedstock-laden substrate into a cooled zone of the solidification apparatus in order to directionally solidify the liquid within the channels, and removing the solidified liquid from within the channels to form a casting comprising an ordered, porous body of precipitated solute and/or particles within the channels. The relic pores within the porous body can be aligned substantially parallel to the crystal growth direction and can have an aspect ratio greater than 1 (e.g., greater than 1, 2, 4 or 10), where the aspect ratio represents a ratio of length to cross-sectional dimension (height, width or diameter). During or after the process of removing the solidified liquid from within the channels to form the porous casting, the casting can be optionally densified. The act of densification, if used, can result in partial sintering such that microporosity is removed from the cast structure, but the macroporosity formed by the solidified liquid is retained.

The particles can include metallic, ceramic, or polymeric particles such as, for example, carbon, silicon, germanium, tin, copper, alumina, silica, zirconia, Teflon®, polyethylene, etc., as well as mixtures and alloys thereof. A dispersion can comprise from 0.1 to 90 vol. % particles dispersed in the liquid. The liquid feedstock may include solid particles or particle precursors that, for example, cross-link, gel or precipitate to form particles.

In a further embodiment, a multi-component feedstock can be a single-phase liquid that comprises solute dispersed in a suitable solvent. Example solute materials include silicic acid, polyvinyl alcohol (PVA), etc. Example solvents include water, alcohols, etc. The feedstock can comprise from about 0.01 to 90 vol. % solute dispersed in the solvent.

In lieu of the multi-component liquid feedstocks described above, the liquid feedstock can comprise a single-component, which can be directionally solidified to produce a substantially non-porous casting. Example single-component liquid feedstocks include molten silicon, germanium, tin, copper, etc.

With each of the foregoing exemplary liquid feedstock, suitable components (particles, solvent, solute, etc.) can be chosen by a skilled artisan depending, for example, on the desired porosity or other properties of the casting. The particles, if used, can have an average particle size ranging from a few nanometers to about 10 μm. In an embodiment, solid particles incorporated into the liquid feedstock can have an average particle size up to about 10% of the effective dimension (height, width, diameter) of the channel into which the liquid feedstock is incorporated.

A multi-component liquid feedstock such as a dispersion may optionally include one or more solvents or other feedstock modifiers such as surfactants, dispersants, binders, pore formers, etc. that can used, for example, to control nucleation, crystal growth, crystal habit, agglomeration, flocculation and/or precipitation. Dispersants such as DARVAN® brand dispersants, which are aqueous solutions comprising sodium and ammonium polymethacrylate, can be used to prevent agglomeration of the particles in the slurry. Binders such as polyvinyl alcohol (PVA) can be used to enhance green body strength of the templated particles prior to sintering. Pore formers such as starch can be used to enhance the pore size, pore volume and/or connectivity in the resulting casting.

In the example of a liquid feedstock containing particles or a solute, the particles/solute initially suspended in the feedstock are continuously rejected from the solidifying phase. As the crystals grow, liquid is partitioned between the solid and liquid phases. The particles or solute will accumulate in front of the advancing solid-liquid interface and be swept in between adjacent crystals (i.e., along the grain boundaries). Thus, in the case of deep cellular or dendritic interface morphologies, the particles/solute are trapped in the inter-cellular or inter-dendritic spaces. The loss of liquid to the solid phase effectively increases the concentration of particles or solute in the liquid phase, resulting in an increase in the concentration along the crystal growth direction.

Figure 1:
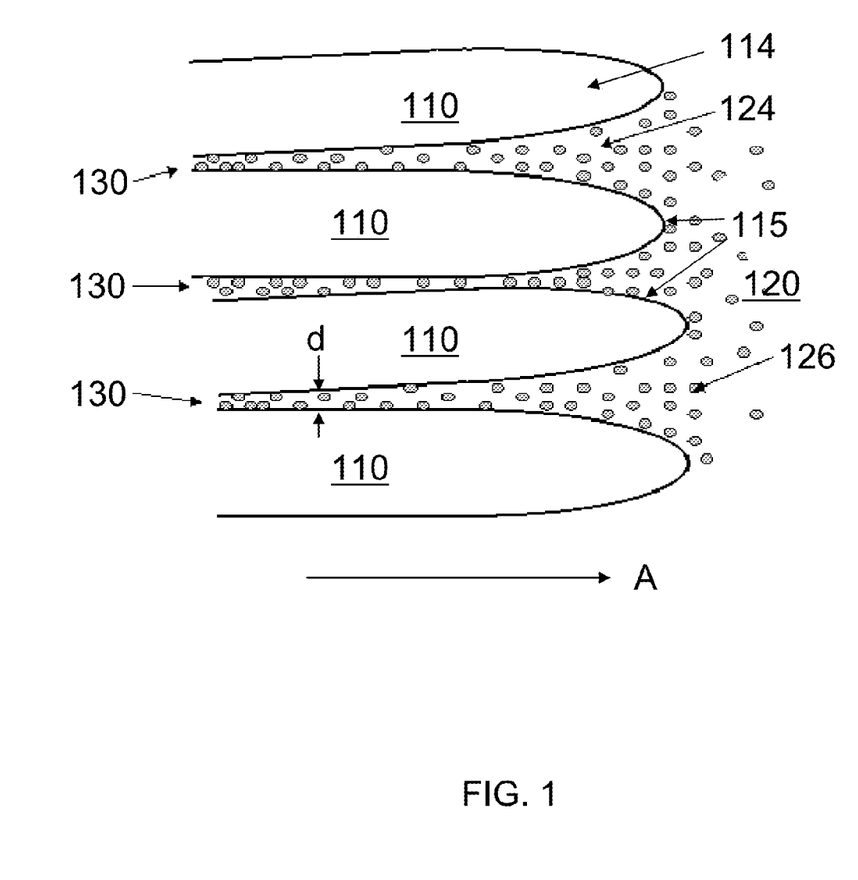
FIG. 1 is a schematic drawing depicting aspects of directional solidification.

These basic attributes of directional solidification involving a multi-phase, multi-component liquid feedstock are shown schematically in FIG. 1. As illustrated in cross-section, a plurality of crystal grains (e.g., ice crystals) 110 are growing from a particle-laden liquid feedstock 120 in a crystal growth direction indicated by arrow A. As the crystal grains grow, liquid phase 124 in transformed into solidified phase 114 at solid-liquid interfaces 115. The liquid feedstock 120 comprises both a liquid phase 124 (e.g., water) having a solid phase (e.g., ceramic particles) 126 dispersed therein. As the liquid phase solidifies, the particles 126 are constantly rejected from the growing crystal grains 110 and accumulate within the inter-cellular or inter-dendritic spaces 130 defining an inter-granular spacing d. The inter-granular spacing may be constant or variable along the crystal growth direction.

To form porous castings, the solidified (e.g., ice) crystals are removed to create the pore structure. The solidified crystals can be removed, for example, by freeze drying whereby the solidified material is transformed directly to the gas phase by sublimation, thus avoiding potential damage caused by surface tension. During sublimation, the pressure is lowered, and enough heat is supplied for the solidified phase to sublimate away. As the gas leaves the system, it leaves behind relic pores in the shape of the previously solidified crystals, i.e., the pores are a replica of the cellular, columnar, lamellar and/or dendritic structure once occupied by the solidified phase.

As the sublimation process concludes, a porous body is formed having a desirable pore morphology. The porous casting can comprise a two-dimensional array of linear pores or a three-dimensional array of pores. The pores can have a variety of cross-sectional shapes including, for example, circular, oval, or rectangular.

In embodiments where a binder or other modifier is incorporated into the liquid feedstock, an optional de-binding step followed by sintering of the cast structure at an elevated temperature can densify the porous body within the channels of the honeycomb substrate. While micro-porosity may or may not be removed by sintering, the macro-porosity created by the crystals is advantageously retained.

In the example of a liquid feedstock comprising a multi-component, single-phase solution, such as a solution of silicic acid in water, the silicic acid can gel prior to or during solidification to form a silicon oxyhydroxide that can phase separate and polymerize to form silica flakes and/or fibers.

The honeycomb substrate itself can be separated from the casting (e.g., by etching, evaporating, leaching, subliming, pyrolyzing, etc.) either before, during or after sintering to produce an array of free-standing castings. Optionally, the array can be melded together in a further processing step to form a monolithic body. Thus, in one embodiment, the casting is a composite material comprising a honeycomb substrate having a porous or non-porous cast material incorporated into the honeycomb channels. In a further embodiment, the casting consists essentially of the cast structure that was formed by directional solidification within channels of a honeycomb substrate, which was subsequently removed.

With the foregoing methods of making a templated casting, independent crystals are grown in each channel of the honeycomb substrate. This localization of the solidification in each channel leads to a number of buffering and baffling advantages that facilitate scale-up of the process, particularly with respect to the formation of porous castings.

The honeycomb-templated directional solidification process advantageously ameliorates the propensity during directional solidification for randomly-oriented crystals to nucleate and grow unabated. Although the direction of the maximum temperature gradient will eventually promote oriented, parallel grain growth of cellular or dendritic grains, actual processing conditions will likely produce a finite number of mis-orientated (non-parallel) grains that grow and impinge upon one another. This grain impingement can result in an undesired reduction in the available contiguous porosity, a decrease in permeability, and an increase in the tortuosity of the porous casting.

In conventional directional solidification, inefficiencies associated with the nucleation and growth of non-parallel grains are exacerbated by larger diameter ampoules and therefore pose challenges to scale-up. With the present configuration, however, which involves the confinement of crystal grains within individual honeycomb channels, non-parallel grains in neighboring channels cannot interact with each other, which ultimately results in enhanced directionality and reduced tortuosity.

The confinement of grains within individual honeycomb channels prohibits wide-scale impingement of non-parallel grains, which ultimately results in enhanced directionality and reduced tortuosity. Because the honeycomb substrate effectively decouples the overall casting dimension from the characteristic dimensions that affect thermal and chemical convection, difficulties with thermal and chemical convection induced non-homogeneity along the growth interface and the loss of directionality due to impingement of non-parallel grains can be largely overcome.

An additional advantage of the present approach relates to diminishing the effect of thermal gradients during solidification. As noted above, radial thermal gradients and vertically-unstable density stratifications can lead to buoyancy-driven thermal convection that can interfere with desired microstructure formation. The convection-driven flow adjacent to the solid-liquid interface can lead to significant particle and/or solute segregation that, in turn, leads to non-homogeneity of the microstructure. Ideally, diffusion during directional solidification is limited to only diffusional transport ahead of the solid-liquid interface.

Thermal convection scales with the cubic power of the effective spatial dimension of the liquid body being solidified. Without wishing to be bound by theory, in conventional directional solidification systems, the impact of thermal convection is proportional to $(d_{amp})^3$, where $d_{amp}$ is the effective dimension (e.g., diameter) of the liquid ampoule as measured in the plane of the solidification front (i.e., in the plane normal to the crystal growth direction). Thus, thermal convection and its attendant disadvantages can become increasingly difficult to manage as the ampoule diameter increases. In most directional solidification systems, radial thermal gradients directly threaten successful scale-up The detrimental effects of thermal convection and radial thermal gradients, particularly in the context of scale-up, can be largely overcome by localizing the solidification within individual channels of a honeycomb substrate. In other words, where $d_{chan}$ is the effective dimension (e.g., diameter or width) of each channel, and $d_{honey}$ is the effective dimension of the honeycomb substrate ($d_{chan} \ll d_{honey}$), thermal and chemical convection will be proportional to $(d_{chan})^3$ and will be independent of $d_{honey}$. Thus, the dimension that impacts convection, $d_{chan}$, is effectively decoupled from the scale-up dimension, $d_{honey}$.

A still further advantage of using honeycomb substrates to control the directional solidification is the enhanced green body strength imparted by the honeycomb substrate, particularly in conjunction with large dimension porous castings. Despite the use of organic and inorganic binding agents, which can be used to increase the mechanical robustness of a green body, both the acts of sublimation and sintering can lead to collapse of the body if it lacks suitable strength. Indeed, binding agents alone are believed to be inadequate in view of the large stresses and capillary forces that would be encountered in most scaled-up substrates.

The control over the directionality, tortuosity, surface area, spacing, shape and strength in honeycomb-templated porous castings offers far-reaching potential for applications in different fields. This includes SOFCs, electrodes, catalysis, sensors, filtration/separation devices, photocatalysts, etc., all of which benefit from a process to make materials with a desired porous microstructure. For example, the directionality (anisotropy), and low tortuosity of the pores can result in enhanced mass and momentum transport along the pores, while dense walls provide better mechanical stability and solid state conductive properties (thermal, electronic, optical, etc.) than random or isotropic porosity.

Porous castings manufactured according to the foregoing methods can be used in Stirling engine regenerators and thermoacoustic regenerators. In a thermoacoustic regenerator, for example, high-amplitude sound waves can be used to pump heat from one place to another, or a temperature gradient can be used to induce sound, which can be converted to electricity. Example applications for a thermoacoustic regenerator comprising the porous casting include the liquefaction of natural gas, hybrid vehicles and combination stove/refrigerator/water purifiers. Details of thermoacoustic regenerators are described, for example, in U.S. Pat. Nos. 6,725,670 and 5,901,556, the contents of which are hereby incorporated by reference in their entirety.

EXAMPLES

Embodiments will be further clarified by the following examples.

Figure 2A:
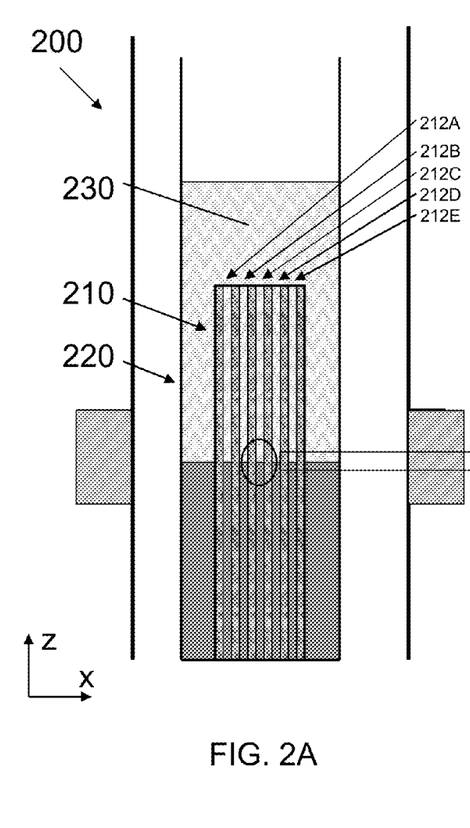
FIG. 2A is a schematic illustration of a Bridgman directional solidification apparatus.

A Bridgman-type directional solidification system 200 is shown schematically in cross-section in FIG. 2. Axes X and Z denote a radial and the axial directions, respectively. A Celcor® honeycomb substrate 210 is immersed into a crucible 220 containing a liquid feedstock 230 comprising a mixture of about 40 wt. % colloidal alumina and 2 wt. % poly(vinyl) alcohol in water. The Celcor® honeycomb substrate comprises a square array of channels with each channel measuring about 800×800 μm². The wall thickness separating adjacent channels is about 80 μm. As a result of the immersion, honeycomb channels 212A-E are filled with the liquid feedstock.

The crucible 220 is suspended from a guide wire (not shown) and lowered into an insulated Bridgman-type tube furnace 250. The furnace comprises heated zone 252, adiabatic zone 254, and cooled zone 256. The length L of the adiabatic zone is about 5 cm. During the solidification process, the temperature of the heated zone is between about 20° C. and 25° C., the temperature of the cooled zone is between about −80° C. and −50° C., and the relative translation rate of the crucible from the heated zone 252 through the adiabatic zone 254 into the cooled zone 256 is about 20 μm/sec.

By taking into account the compositional and geometric properties of the sample, and by selecting the heated and cooled zone temperatures, the length of the adiabatic zone and the translation rate, the solid-liquid interface can be maintained within the adiabatic zone 254 along solidification front 234. The solid-liquid interface separates liquid region 232 from solidified region 236.

Figure 2B:
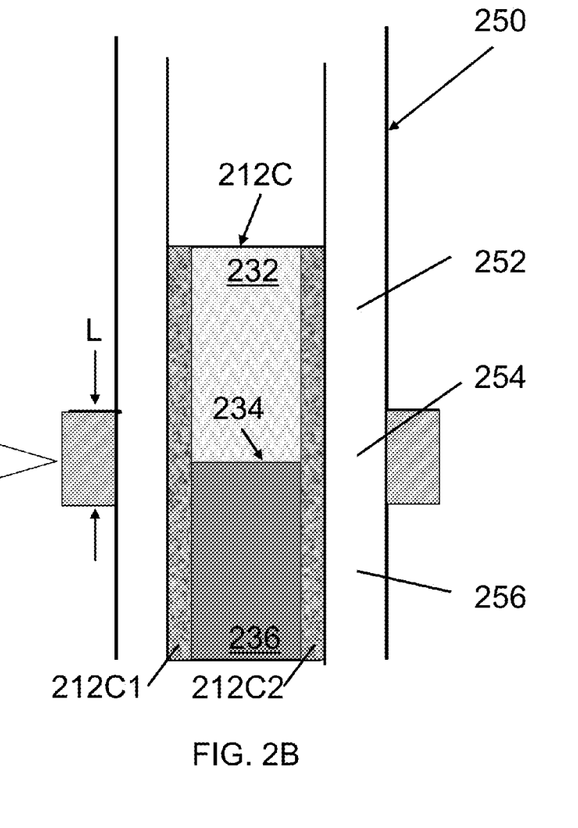
FIG. 2B is a detailed view of FIG. 2A.

Referring in particular to FIG. 2B, depicted is a snapshot of the solidification process with respect to a single channel 212C of substrate 210. Channel 212C is defined in part by channel walls 212C1 and 212C2. These channel walls are shared with neighboring channels 212B and 212D (FIG. 2A). Due to the adiabatic zone 254, heat flux lines crossing the solidification front 234 are substantially perpendicular to the solidification front, which can reduce convection effects in the radial direction.

Figure 3:
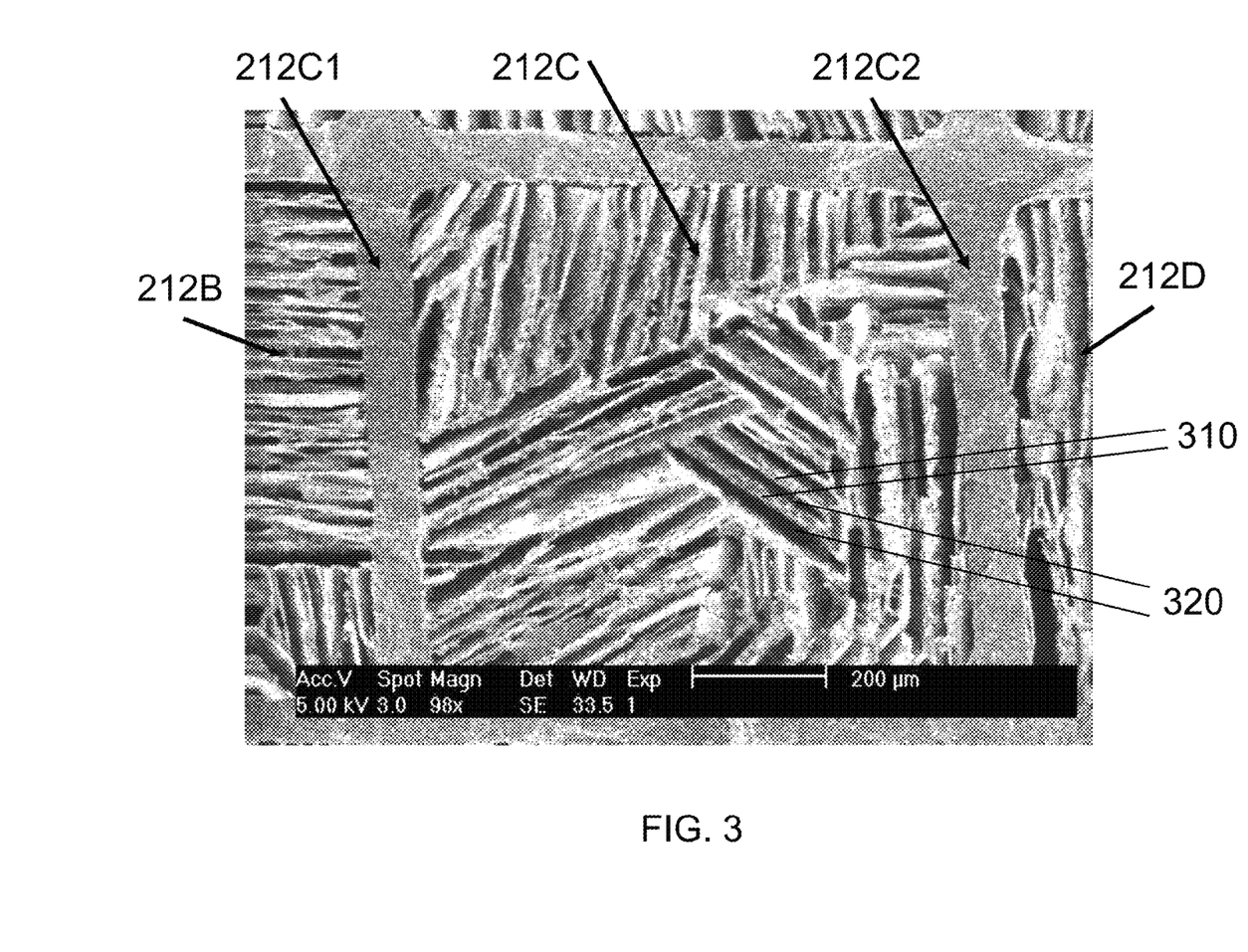
FIG. 3 is a scanning electron micrograph of a face of an exemplary porous body.

After directional solidification, the crucible contents are freeze dried and sintered. FIG. 3 shows a representative scanning electron micrograph (SEM image) of channels 212B, 212C and 212D. In this axial view, channel walls 212C1 and 212C2 are clearly visible. The channels each comprise a porous casting of directionally solidified alumina. The alumina micro-lamellae comprise axial platelets 310 of sintered colloidal alumina separated by platelet-shaped pores 320. The platelets and pores are aligned in a direction substantially parallel to the channels. The inter-lamellae spacing is about 30 μm.

Figure 4:
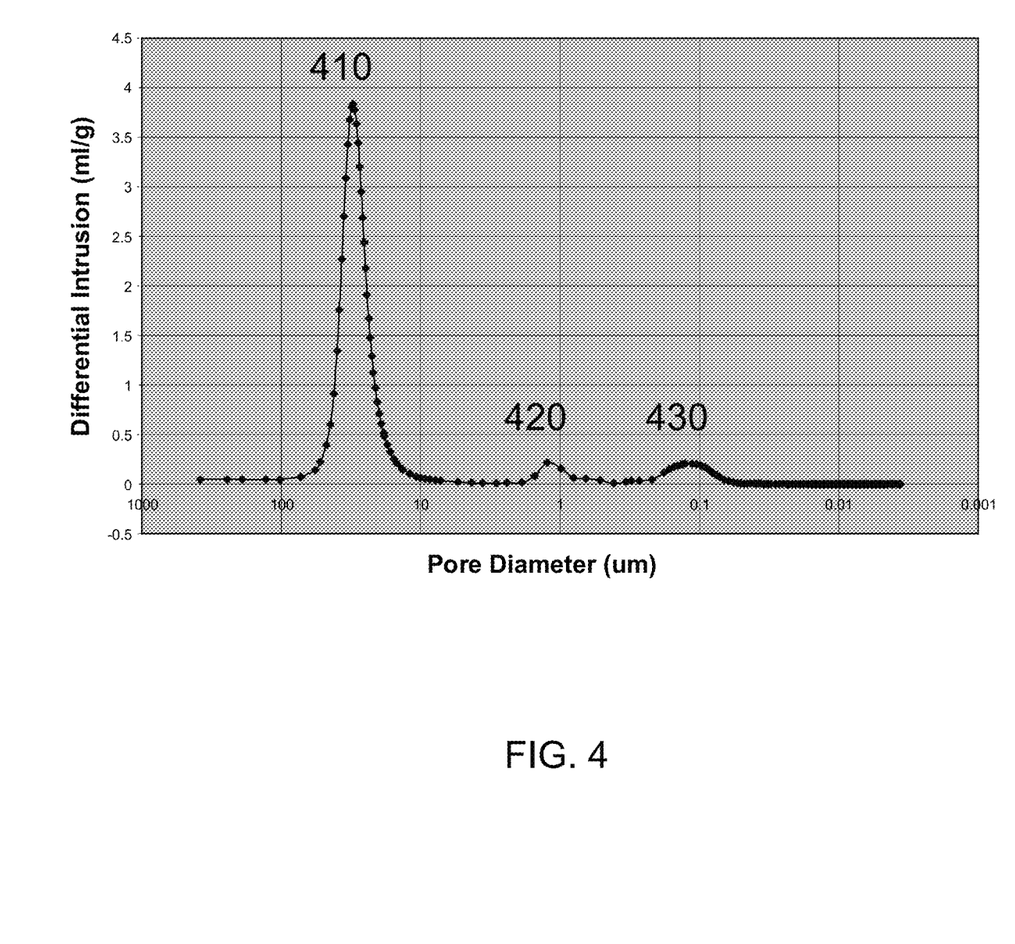
FIG. 4 is a plot of mercury porosimetry data for an exemplary porous ceramic body manufactured according to an embodiment.

Mercury porosimetry data for the foregoing porous casting is shown in FIG. 4. The predominant peak 410 corresponds to the inter-lamellae spacing of about 30 μm. Peak 420 corresponds to the inherent 1-2 μm porosity of the cordierite web material comprising the Celcor® honeycomb walls, and peak 430 corresponds to the colloidal alumina interstitial porosity (100-200 nm).

For comparison, a modified honeycomb substrate was made by reduction extrusion (RE) whereby a commercially-available un-fired honeycomb substrate was cold-worked to have a mean channel diameter of about 60 μm and a measured porosity of about 79%. The reduction extrusion process is relatively complicated and involves rehydration of the honeycomb green body, and backfilling of the honeycomb channels with a suitable liquid wax that prevents collapse of the channels during reduction extrusion.

Porosimetry and permeability data for the directionally solidified (DS) porous casting and the comparative reduction extrusion (RE) substrate are shown in Table 2. The directionally solidified porous casting has a mean channel diameter ($D_{50}$) of about 29 μm compared to the approximately 60 μm channel diameter of the reduction extrusion sample. The inventive and comparative samples have comparable porosity.

TABLE 2

Porosimetry and permeability data

| Sample | D50 [μm] | Porosity [%] | Permeability (10 psi) [Darcy] |
|---|---|---|---|
| DS | 29 | 75 | 65-67 |
| DS* | 60 | 75 | 282 |
| RE† | 58-62 | 79 | 200-400 |

†Comparative
*Modeled (assumes D50 = 60 microns). $282 = 66(60/29)^2$.

The intrinsic permeability k of any porous material is $k=Cd^2$, where C is a dimensionless constant that is related to the configuration of the flow paths and d is the average, or effective pore diameter. The permeability can be calculated from Darcy's Law, which defines a relationship for the fluid flow rate q through a porous medium as:

$$q = \frac{kA}{\mu} \cdot \frac{\Delta p}{\Delta x}$$

where A=cross-sectional area, μ=viscosity, and Δp=the pressure difference across a distance Δx. Thus, a single Darcy unit is the permeability of a porous medium that will allow a flow of one ml/sec of fluid of one centipoise viscosity through one square centimeter under a pressure gradient of one atmosphere per centimeter.

Referring to Table 2, the permeability of the directionally solidified porous casting having a mean channel diameter of about 29 μm is about 66 Darcy, while the permeability of the comparative reduction extrusion honeycomb substrate having a mean channel diameter of about 60 μm is between 200 and 400 Darcy.

By taking into account the disparity in mean channel diameters between the two samples, an effective permeability for the directionally solidified porous casting can be estimated. The modeled permeability for the directionally solidified porous casting is 282 Darcy, which assumes a mean channel diameter of 60 μm. This value compares favorably with the reduction extrusion sample, showing good pore connectivity.

As used herein, the singular forms "a," "an" and "the" include plural referents unless the context clearly dictates otherwise. Thus, for example, reference to a "liquid" includes examples having two or more such "liquids" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein may refer to a component of the present invention being "programmed" or "configured" in a particular way. In this respect, such a component is "programmed" or "configured" to embody a particular property, or function in a particular manner, where such recitations are structural recitations as opposed to recitations of intended use. More specifically, the references herein to the manner in which a component is "programmed" or "configured" denote an existing physical condition of the component and, as such, are to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A templated casting comprising:
    a honeycomb substrate having a plurality of channels; and
    a directionally-ordered cast structure formed within the channels,
wherein the cast structure comprises one or more pores aligned in a direction substantially parallel to the channels.

2. The casting according to claim 1, wherein the cast structure is aligned in a direction substantially parallel to the channels.

3. The casting according to claim 1, wherein the pores have an aspect ratio greater than 1.

* * * * *

UNITED STATES PATENT AND TRADEMARK OFFICE
CERTIFICATE OF CORRECTION

PATENT NO. : 9,238,594 B2  
APPLICATION NO. : 13/617429  
DATED : January 19, 2016  
INVENTOR(S) : Prantik Mazumder et al.

Page 1 of 1

It is certified that error appears in the above-identified patent and that said Letters Patent is hereby corrected as shown below:

Title page  
Item (75) Inventors:

Inventor John Forrest Wright, Jr., Corning, NY (US);  
should be John Forrest Wight, Jr., Corning, NY (US);

Signed and Sealed this  
Seventh Day of June, 2016

Michelle K. Lee  
*Director of the United States Patent and Trademark Office*